United States Patent
Onda et al.

(10) Patent No.: US 8,396,939 B2
(45) Date of Patent: Mar. 12, 2013

(54) CONTENT DISTRIBUTION MANAGEMENT DEVICE, TERMINAL, PROGRAM, AND CONTENT DISTRIBUTION SYSTEM

(75) Inventors: Yasushi Onda, Tokyo (JP); Dai Kamiya, Tokyo (JP); Yusuke Kushida, Tokyo (JP); Keiichi Murakami, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/527,103

(22) PCT Filed: Feb. 14, 2008

(86) PCT No.: PCT/JP2008/052413
§ 371 (c)(1),
(2), (4) Date: Mar. 16, 2010

(87) PCT Pub. No.: WO2008/099870
PCT Pub. Date: Aug. 21, 2008

(65) Prior Publication Data
US 2011/0138074 A1    Jun. 9, 2011

(30) Foreign Application Priority Data
Feb. 14, 2007    (JP) .................................. 2007-33597

(51) Int. Cl.
*G06F 15/16* (2006.01)
(52) U.S. Cl. .......................... 709/217; 709/227; 345/467
(58) Field of Classification Search .................. 709/217, 709/227; 345/467
See application file for complete search history.

(56) References Cited

U.S. PATENT DOCUMENTS

| | | | |
|---|---|---|---|
| 5,163,977 | A | 11/1992 | Jensvold et al. |
| 5,445,669 | A | 8/1995 | Nakabayashi et al. |
| 5,795,920 | A | 8/1998 | Kang et al. |
| 5,936,004 | A | 8/1999 | Altmeier |
| 6,571,256 | B1 | 5/2003 | Dorian et al. |

(Continued)

FOREIGN PATENT DOCUMENTS

| | | |
|---|---|---|
| CN | 1523481 | 8/2004 |
| CN | 1656448 | 8/2005 |

(Continued)

OTHER PUBLICATIONS

Russian Office Action for RU Application No. 2009134159/09(048105) dated Dec. 15, 2010.

(Continued)

*Primary Examiner* — Adnan Mirza
(74) *Attorney, Agent, or Firm* — Michaud-Kinney Group LLP

(57) ABSTRACT

A content distribution system includes a content distribution management device and a communication terminal. A storage unit stores one or a plurality of addresses. A receiving unit receives content data addressed to a communication terminal. A determination unit determines whether or not the address of the origin of the received content data is an address that is stored in the storage unit. A sending unit where the determination unit has determined that the address of the origin of the received content data is stored in the storage unit, sends the content data and parameters specifying the format in which content is to be displayed to a communication terminal. The communication terminal includes a receiving unit that receives parameters and content data from the content distribution management device; and a content display control that controls the display format in accordance with received parameters.

9 Claims, 6 Drawing Sheets

U.S. PATENT DOCUMENTS

| | | | |
|---|---|---|---|
| 6,980,213 B1 * | 12/2005 | Hirose et al. | 345/467 |
| 6,987,987 B1 | 1/2006 | Vacanti et al. | |
| 7,356,569 B1 * | 4/2008 | Kembel et al. | 709/217 |
| 2002/0019941 A1 | 2/2002 | Chan et al. | |
| 2003/0060189 A1 | 3/2003 | Minear et al. | |
| 2006/0101514 A1 | 5/2006 | Milener et al. | |
| 2006/0129628 A1 | 6/2006 | Kamiya et al. | |
| 2008/0066089 A1 | 3/2008 | Kamiya et al. | |
| 2010/0024651 A1 | 2/2010 | Bansal | |
| 2010/0211861 A1 | 8/2010 | Onda et al. | |

FOREIGN PATENT DOCUMENTS

| | | |
|---|---|---|
| EP | 0570123 A1 | 11/1993 |
| JP | 06-103058 | 4/1994 |
| JP | 2000148340 | 5/2000 |
| JP | 2000276471 | 6/2000 |
| JP | 2000-276471 | 10/2000 |
| JP | 2001-117769 | 4/2001 |
| JP | 2001-156942 | 6/2001 |
| JP | 2001-333155 | 11/2001 |
| JP | 2004-046478 | 2/2004 |
| JP | 2004046478 | 2/2004 |
| JP | 2004-178512 | 6/2004 |
| JP | 2004178512 | 6/2004 |
| JP | 2004246489 | 9/2004 |
| JP | 2005-004631 | 1/2005 |
| JP | 2005-032041 | 2/2005 |
| JP | 2005032041 | 2/2005 |
| JP | 2005339045 | 12/2005 |
| JP | 2006-172463 | 6/2006 |
| JP | 2006285844 | 10/2006 |
| JP | 2007-011967 | 1/2007 |
| KR | 200688850 | 11/2006 |
| KR | 10-2006-0124542 A | 12/2006 |
| KR | 20080287098 | 11/2008 |
| WO | 99/30217 | 6/1999 |
| WO | 0065763 | 11/2000 |
| WO | 2006129923 A1 | 12/2006 |

OTHER PUBLICATIONS

Bott, E., Siechert C., Microsoft Windows XP Inside Out, 2004.
Korean Patent Application No. 10-2009-7016653; Office Action Dated Jan. 14, 2011.
Sato, Kazuto, "HTML MANIAX" Internet Magazine No. 96 Jan. 1, 2003, pp. 180-183.
Korean Office Action for KR Patent App. No. 10-2009-7016483 dated Mar. 23, 2011, with full English translation.
Russian Office Action for 2009133463/08(047070) dated Oct. 1, 2010.
Office Action from corresponding Russian Application No. 2009134159/07 (048105) dated Jul. 8, 2011. English translation included.
Korean Patent Application No. 10-2009-7016653; Korean Final Office Action Dated Sep. 30, 2011.
Japanese Patent Application No. 2007-033597; Japanese Office Action Mailed Oct. 25, 2011.
Chinese Patent Application No. 200880004902.5; Chinese Office Action Mailed Nov. 16, 2011.
Korean Patent Application No. 10-2009-7016483; Korean Final Office Action Mailed Dec. 2, 2011.
Office Action for corresponding U.S. Appl. No. 12/524,107 dated May 9, 2012.
Office Action with English Translation, Dated Mar. 19, 2012; issued in conjunction with Chinese Patent Application No. 200880004279.3.
Office Action with English Translation, Dated Feb. 7, 2012; issued in conjunction with Japanese Patent Application No. 2007-033597.
Office Action, Mailing Date—Dec. 27, 2011, issued in conjunction with U.S. Appl. No. 11/932,398.
PCT International Search Report dated Jul. 1, 2003 (PCT/JP03/06218).
"NOVITAMAIL", Intercom, Inc., dated Oct. 1998.
Office Action, Mailing Date—Apr. 12, 2006, issued in conjunction with U.S. Appl. No. 10/515,395.
Office Action, Mailing Date—Jul. 31, 2007, issued in conjunction with U.S. Appl. No. 10/515,395.
European Patent Application No. 03730523.2, Supplementary Partial European Search Report dated Feb. 8, 2007.
European Patent Application No. 03730523.2, Supplementary European Search Report dated Nov. 10, 2007.
Office Action, Mailing Date—Apr. 15, 2008, issued in conjunction with European Patent Application No. 03730523.2.
Office Action with English Translation, Mailing Date—Apr. 30, 2008, issued in conjunction with JP Patent Application No. 2002-145281.
Office Action issued in the Chinese Patent Application No. 200880004902.5 issued on Aug. 3, 2012.
Office Action issued in U.S. Appl. No. 12/524,107 issued on Oct. 3, 2012.
Final Office Action issued in U.S. Appl. No. 11/932,398 dated Sep. 20, 2012.

* cited by examiner

CONTENT DISTRIBUTION MANAGEMENT DEVICE, TERMINAL, PROGRAM, AND CONTENT DISTRIBUTION SYSTEM

FIELD OF THE INVENTION

The present invention relates to a technique for providing digital content over a communication network.

BACKGROUND OF THE INVENTION

Many mobile telephones have come to include browsers capable of interpreting content written in a markup language such as CHTML (Compact HyperText Markup Language), and communication environments in which mobile telephone users can obtain and browse various types of information from the Internet in the same manner as when using personal computers are continually being developed. Against this background, where such environments are being developed, businesses called "content providers", which store various mobile telephone content in a server on the Internet and distribute that content, are appearing. However, among such businesses, there are also many malicious parties that provide content intended to charge users improperly, force the dissemination of information, and so on, against the intentions of the mobile telephone user. JP 2004-178512A can be given as a document disclosing a scheme for supporting the prevention of the inadvertent access of such content from malicious content providers. According to the content browsing device disclosed in this document, when an object (icon) such as a pointer or cursor moves onto an element within content obtained from a certain URL (Uniform Resource Locator) and displayed, and that element is hyperlinked to a different URL, an outline, attributes, or the like of the content to which the hyperlink leads is displayed as a pop-up. Adding this scheme to a preexisting mobile telephone makes it possible for a user to understand, in advance, whether the content to which the hyperlink leads is provided by a malicious content provider. JP 2005-32041A, JP 2004-46478A, and JP 2000-276471A also disclose similar techniques.

However, according to the schemes disclosed in the aforementioned documents, when displaying the content present at a hyperlink that leads to a different URL, the mobile telephone cannot perform the pop-up display without also acquiring definition data that defines the outline, attributes, and so on of the content to which the hyperlink leads. A problem may therefore arise in that the communication processing performed by the mobile telephone will increase due to the acquisition of the definition data.

Having been devised in light of the aforementioned background, it is an object of the present invention to provide a scheme that issues a warning in response to an operation about to be performed by a user, without increasing the processing load of the terminal apparatus.

SUMMARY OF THE INVENTION

A content distribution management device according to an aspect of the present invention comprises: a storage unit that stores one or a plurality of addresses; a receiving unit that receives content data addressed to a communication terminal; a determination unit that determines whether or not the address of the origin of the received content data is an address that is stored in the storage unit; and a sending unit that, in the case where the determination unit has determined that the address of the origin of the received content data is an address that is stored in the storage unit, sends the content data and parameters specifying the format in which content is to be displayed by the communication terminal to which the content data is addressed to that communication terminal.

This aspect may further comprise: a unit that receives a request containing the address of an Internet communication network from the communication terminal; and a unit that transfers the received request to the Internet communication network.

A content distribution management device according to another preferred aspect of the present invention comprises: a storage unit that stores one or a plurality of addresses; a receiving unit that receives, from a communication terminal that has received content data, the address of where the content data is stored; a determination unit that determines whether or not the received address is an address that is stored in the storage unit; and a sending unit that, in the case where the determination unit has determined that the received address is an address that is stored in the storage unit, sends parameters specifying the format in which content is to be displayed by the communication terminal to which the content data is addressed to that communication terminal.

In this aspect, the content data may be code that describes elements that indicate each of display objects that make up the content and layout information of each of the display objects using a predetermined markup language.

In addition, the parameters may be parameters that indicate an element of a display object for which a predetermined pictogram is rendered upon being overlapped with a pointer due to an input unit of the communication terminal being operated after the object has been displayed in the display.

In addition, the parameters may be parameters that indicate an element of a display object for which a predetermined pictogram is rendered upon being highlighted due to an input unit of the communication terminal being operated after the object has been displayed in the display.

The element that indicates the display object may express a hyperlink to an address that has received a predetermined certification.

A communication terminal according to another preferred aspect of the present invention comprises: a display; an input unit; a receiving unit that receives content data that describes elements that each indicate display objects and the layout thereof using a predetermined markup language and parameters that indicate a specific element; a first display control unit that displays a display object indicated by an element contained in the received content data in the display in accordance with the layout information; and a second display control unit that renders a predetermined pictogram when the display object, among the display objects displayed in the display, that is displayed based on the element indicated by the received parameters overlaps with a pointer due to operations of the input unit.

A communication terminal according to another aspect of the present invention comprises: a display; an input unit; a receiving unit that receives content data that describes elements that each indicate display objects and layout information for the display objects using a predetermined markup language, and parameters that indicate a specific element; a first display control unit that displays a display object indicated by an element of the received content data in the display in accordance with the layout information; and a second display control unit that renders a predetermined pictogram when the display object, among the display objects displayed in the display, that is displayed based on the element indicated by the received parameters is highlighted due to operations of the input unit.

A program according to another aspect of the present invention causes a computer device having a display, an input unit, and a communication unit to execute: a step of receiving, via the communication unit, content data that describes elements that each indicate display objects and layout information for the display objects using a predetermined markup language, and parameters that indicate a specific element; a step of displaying a display object indicated by an element of the received content data in the display in accordance with the layout information; and a step of rendering a predetermined pictogram when the display object, among the display objects displayed in the display, that is displayed based on the element indicated by the received parameters overlaps with a pointer due to operations of the input unit.

A program according to another aspect of the present invention causes a computer device having a display, an input unit, and a communication unit to execute: a step of receiving, via the communication unit, content data that describes elements that each indicate display objects and layout information for the display objects using a predetermined markup language, and parameters that indicate a specific element; a step of displaying a display object indicated by an element of the received content data in the display; and a second display control function that renders a predetermined pictogram when the display object, among the display objects displayed in the display, that is displayed based on the element indicated by the received parameters is highlighted due to operations of the input unit.

A content distribution system according to another aspect of the present invention comprises: a content distribution management device that includes a storage unit that stores one or a plurality of addresses, a receiving unit that receives content data addressed to a communication terminal, a determination unit that determines whether or not the address of the origin of the received content data is an address that is stored in the storage unit, and a sending unit that, in the case where the determination unit has determined that the address of the origin of the received content data is an address that is stored in the storage unit, sends the content data and parameters specifying the format in which content is to be displayed by the communication terminal to which the content data is addressed to a communication terminal; and a communication terminal that includes a receiving unit that receives parameters and content data from the content distribution management device, and a content display control unit that displays the received content data and controls the display format thereof in accordance with the received parameters.

DETAILED DESCRIPTION OF THE PREFERRED EMBODIMENT

The terms defined herein should be broadly construed to have the given definitions but should not be limited thereto. "Carrier" refers to a communication organization that runs a mobile packet communication network. "User" refers to a party that, having purchased a mobile terminal, has entered into a contract with the carrier for use of the mobile packet communication network. "Content provider" refers to a party that provides a service for distributing various types of content to users from its own server device located on an Internet communication network. There are, among such content providers, certified content providers that provide a service having been certified by a carrier as not providing content that incurs improper losses on users, and uncertified content providers that provide a service without receiving such certification.

Figure 1:
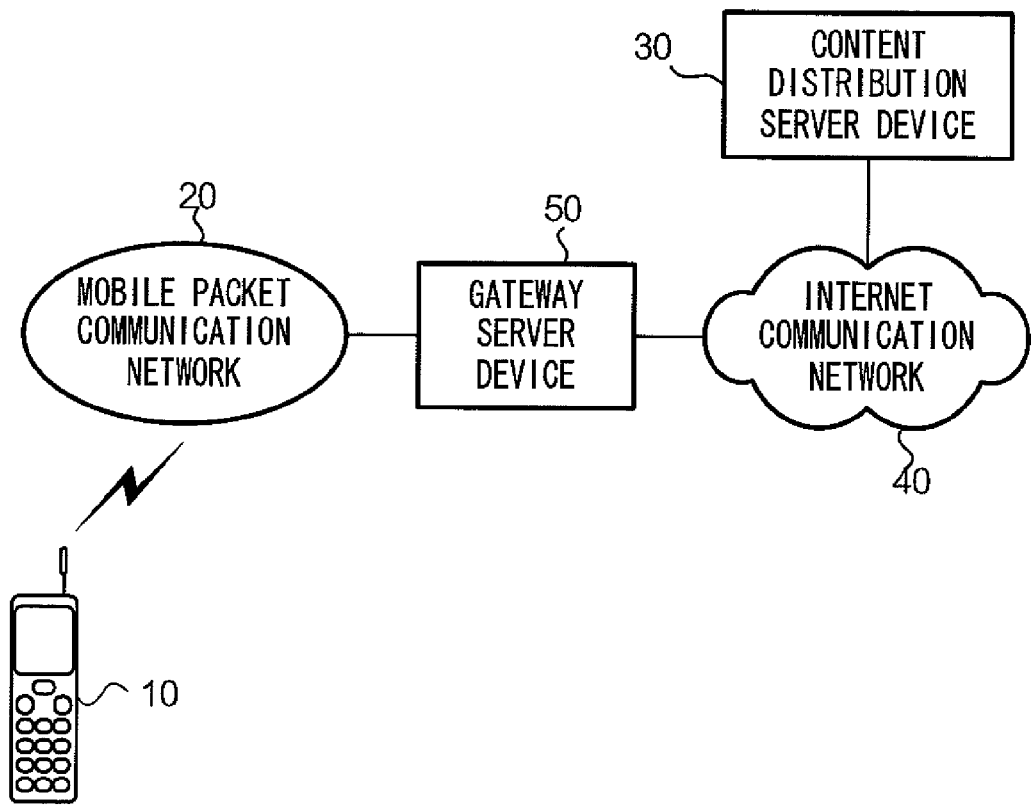
FIG. 1 is a diagram illustrating the configuration of a content distribution system.

FIG. 1 is a diagram illustrating the configuration of a content distribution system according to the present embodiment. As illustrated in the diagram, this system includes a mobile packet communication network 20 to which a mobile terminal 10 is connected, an Internet communication network 40 to which a content distribution server device 30 is connected, and a gateway server device 50 that links the two communication networks.

In the illustrated embodiment, the mobile packet communication network 20 is a collection of nodes that transfers data through procedures compliant with simplified TCP (Transmission Control Protocol)/IP (Internet Protocol) protocol, a protocol equivalent to HTTP (Hypertext Transfer Protocol) implemented under TCP/IP, or the like, and includes base stations, packet processing modules, and so on. Meanwhile, the Internet communication network 40 is a collection of nodes that transfers data through procedures compliant with TCP/IP, HTTP implemented under TCP/IP, SMTP (Simple Mail Transfer Protocol), or the like, and includes, among other things, server devices, routers.

The gateway server device 50 is a computer, managed by a carrier, which is provided in a gateway switching center that connects the mobile packet communication network 20 and the Internet communication network 40 to each other; data that is sent from a node in one of the communication networks to a node in the other communication network undergoes protocol conversion in the gateway server device 50 and is then transferred to the node in the other communication network. The gateway server device 50 also performs processing that is characteristic to the present embodiment when transferring data that has been converted. This processing shall be described in detail below.

Figure 2:
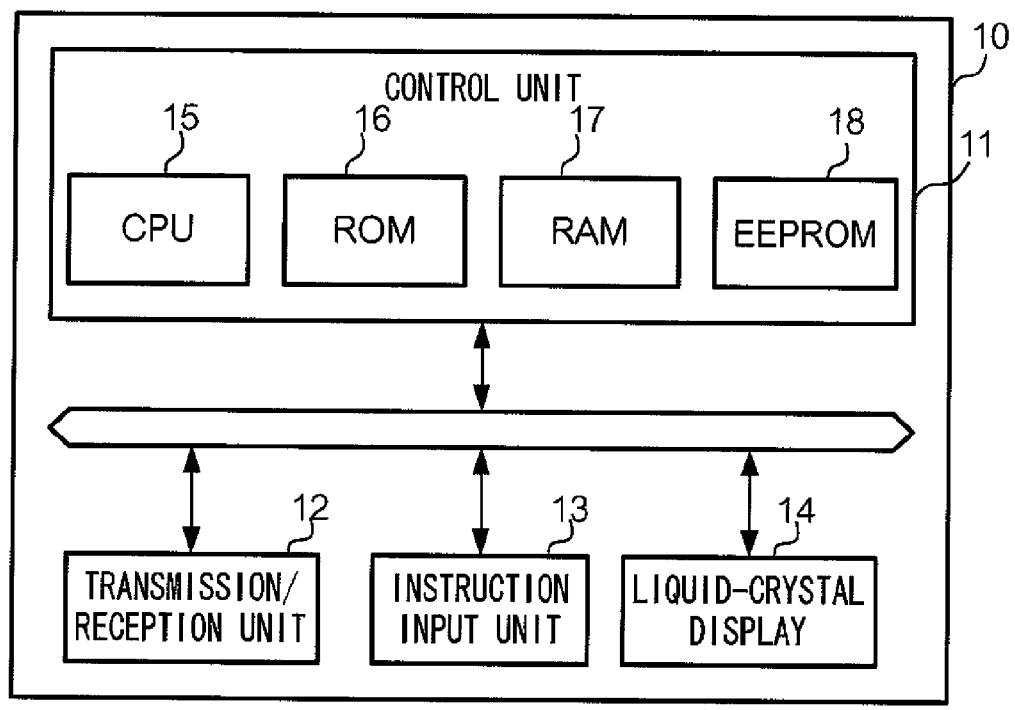
FIG. 2 is a diagram illustrating the physical configuration of a communication terminal.

FIG. 2 is a diagram illustrating the physical configuration of a mobile terminal 10. The mobile terminal 10 includes a control unit 11, a transmission/reception unit 12, an instruction input unit 13, and a liquid-crystal display 14.

The transmission/reception unit 12 performs wireless communication with a base station on the mobile packet communication network 20 under the control of the control unit 11.

The instruction input unit 13 is made up of various buttons, such as push buttons (PBs), and cursor keys; when a user performs input operations, the instruction input unit 13 supplies operational signals corresponding to those input operations to the control unit 11. The liquid-crystal display 14 is configured of a display device such as a liquid-crystal panel, and displays various information under the control of the control unit 11.

The control unit 11 has a CPU 11, a ROM 16, a RAM 17, and a EEPROM 18. The CPU 15 executes various programs stored in the ROM 16, the EEPROM 18, and the like, using the RAM 17 as a work area.

Pre-installed programs are stored in the ROM 16. These pre-installed programs are programs that are stored in the ROM 16 during the manufacturing process of the mobile terminal 10, and are, to be more specific, a multi-task operating system (hereinafter called a "multi-task OS"), Java® platform programs, native applications, and so on. To give a general explanation of these programs, first, the multi-task OS is an operating system that supports various functions, such as the allocation of virtual memory space and so on, that are necessary to realize the pseudo-parallel execution of multiple tasks through a TSS (Time-Sharing System). A Java platform program, meanwhile, is a program group written in accordance with CDC (Connected Device Configuration) so as to be executable within the Java operating environment, which shall be described later. A native application is a program that realizes a basic service of the mobile terminal 10, such as telephony, browsing, email sending/receiving, and so on, and includes an email application for accepting a provided email sending/receiving service, and a browser application for accepting a provided browsing service.

The EEPROM 18 has a region for storing Java applications. Java applications are stored in this region. Java applications have Jar (Java Archive) files that group together a program itself in which is denoted a procedure for performing processing within the Java operating environment and image files, audio files, and so on used during the execution of that program, as well as and ADF (Application Descriptor File) that describes the installation and startup of the Jar file, various attributes thereof, and so on. This Java application is created by a content provider or a carrier and stored in a server device or the like located on the Internet communication network 40, and is downloaded as appropriate from the server device or the like in response to requests from the mobile terminal 10.

Figure 3:
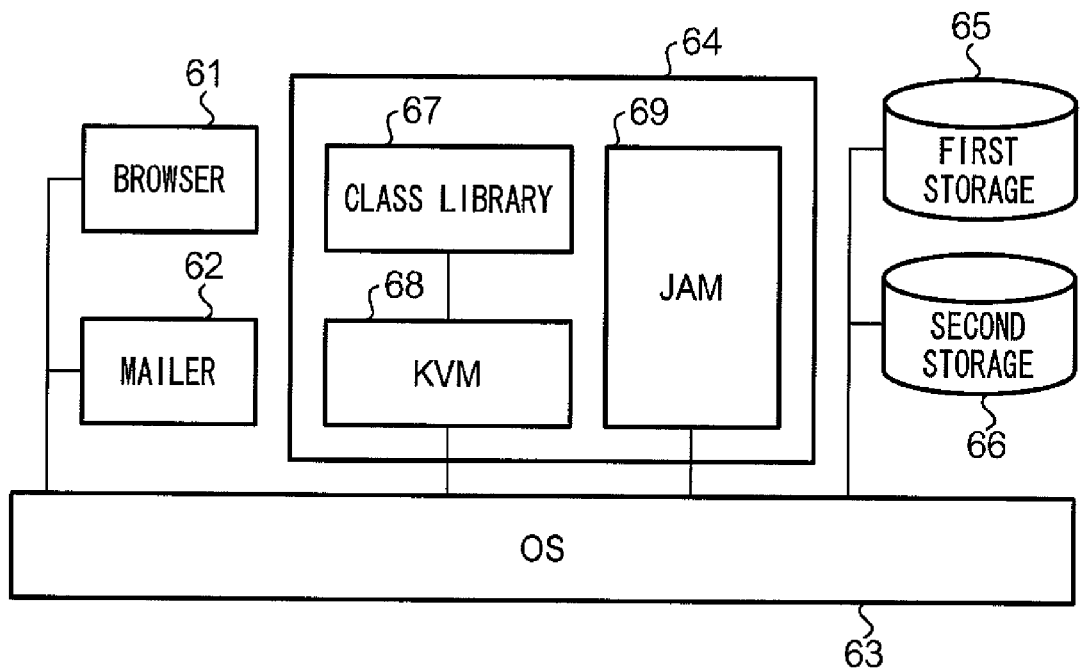
FIG. 3 is a diagram illustrating the logical configuration of a communication terminal.

FIG. 3 is a diagram illustrating the logical configuration of the various units that can be implemented by the control unit 11 of the mobile terminal 10 through the execution of various programs in the ROM 16, the EEPROM 18, and so on. As shown in this diagram, a browser 61, a mailer 62, and a Java operating environment 64 implemented on an OS 63, and furthermore, a first storage 65 and second storage 66 are secured in the EEPROM 18. The browser 61 and mailer 62 are realized through native applications in the ROM 16, and facilitate the reception and analysis of data written in HTML (HyperText Markup Language), the sending and receiving of emails, and so on.

The Java operating environment 64 is realized by a Java platform program in the ROM 16. The Java operating environment 64 is made up of a class library 67, a JVM (Java Virtual Machine) 68, and a JAM (Java Application Manager) 69. The class library 67 is a group of program modules with highly generic, specific functions, called "classes", consolidated into a single file. The JVM 68 is a JVM optimized for CDC, which is a configuration designed for mobile devices in which a multi-task OS is installed, and analyzes and executes bytecode supplied as a Java program. The JAM 69 initiates the downloading and installation of Java applications.

The first storage 65 is a region for storing Java applications (Jar files and ADFs) downloaded under the initiative of the JAM 69. The second storage 66 is a region for storing data generated during the execution of a Java application, following that execution, in which individual storage regions are allocated for each of the installed Java applications. The data in the storage region allocated to a certain Java application is writable only during the execution of that Java application, and is configured so that it cannot be rewritten with another Java application.

Figure 4:
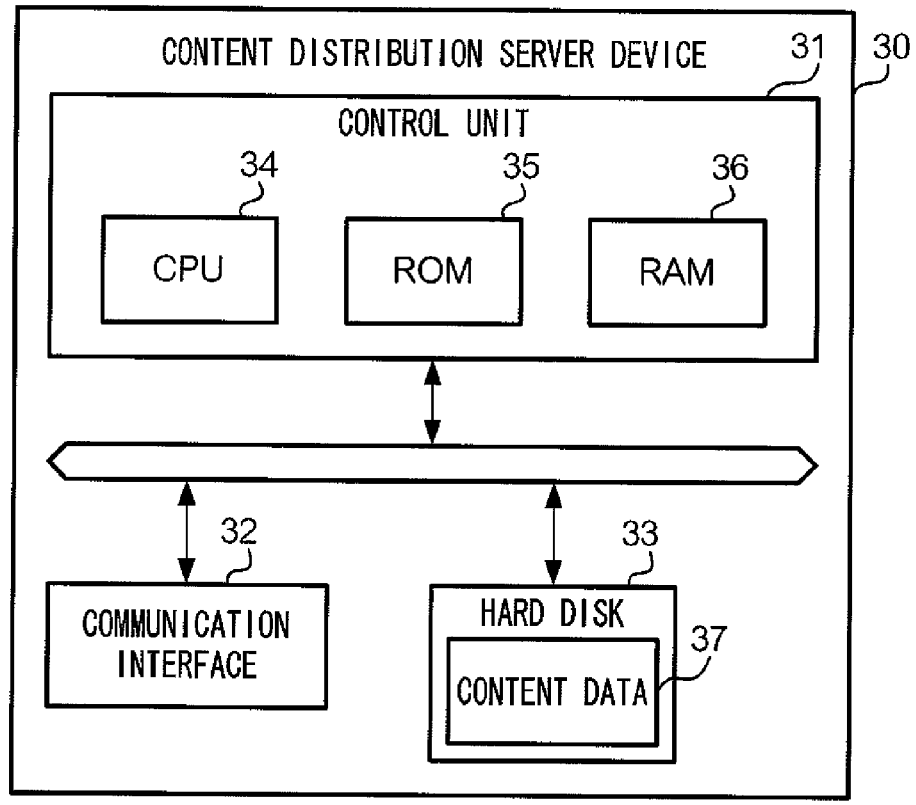
FIG. 4 is a diagram schematically illustrating the hardware configuration of a content distribution server device.

FIG. 4 is a diagram schematically illustrating the hardware configuration of the content distribution server device 30. Each server device 30 is run by a content provider, and includes, as shown in the diagram, a control unit 31, a communication interface 32, and a hard disk 33.

The control unit 31 has a CPU 34, a ROM 35, a RAM 36, and so on.

The communication interface 32 exchanges data in accordance with a protocol such as TCP/IP, HTTP, or the like.

The hard disk 33 stores content data 37. The content data 37 is HTML data, written in HTML (HyperText Markup Language), describing Java applications (Jar files and ADFs) authored by the content providers, who are the operators of the content distribution server device 30, or code defining the details of display objects such as text (for example, hyperlinks) or images (for example, software buttons, textboxes, and so on) (called "elements" hereinafter) and layout information (information indicating in what positions in the liquid-crystal display 14 or the content to arrange the display objects).

Figure 5:
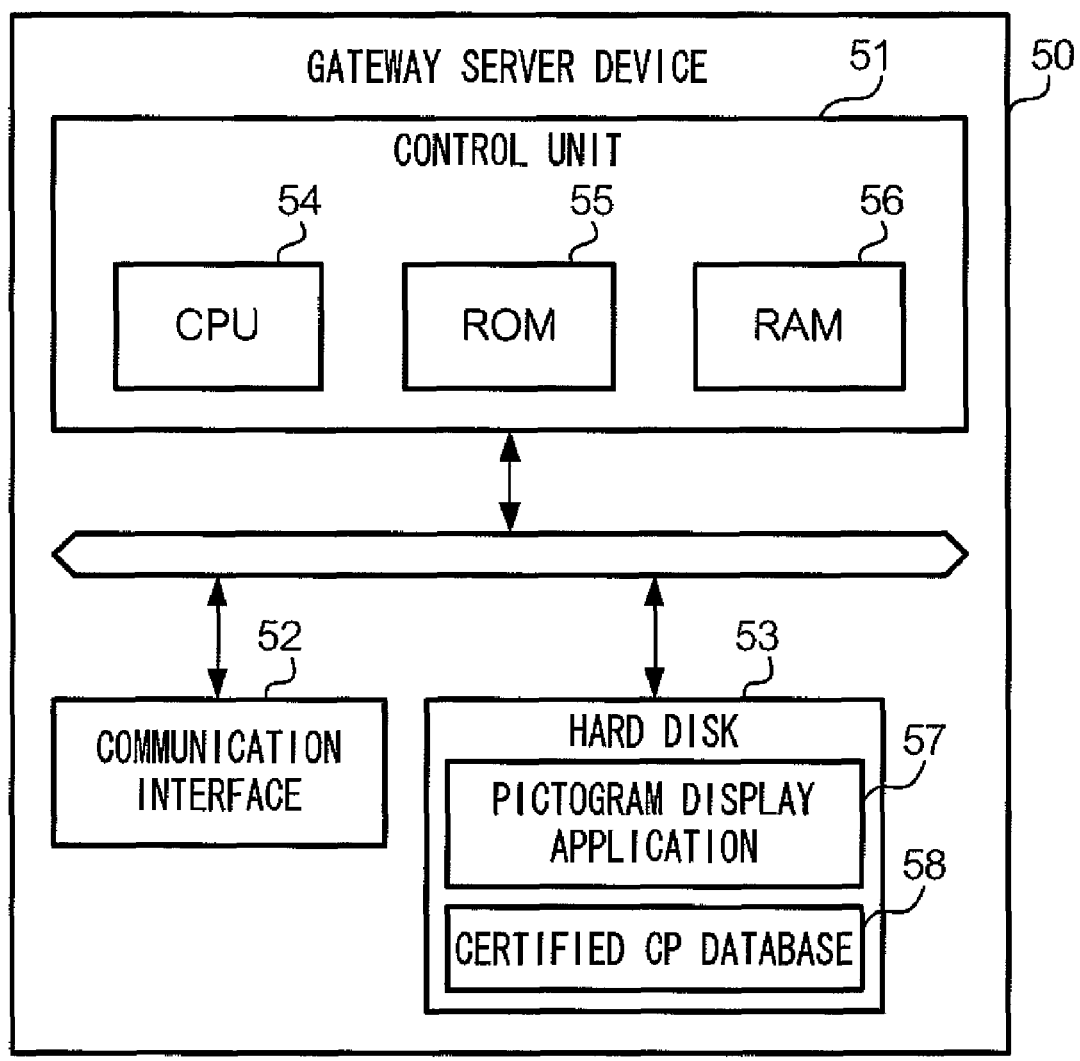
FIG. 5 is a diagram schematically illustrating the hardware configuration of a gateway device.

FIG. 5 is a diagram schematically illustrating the hardware configuration of the gateway server device 50. The server device 50 runs under the management of a carrier, and includes, as shown in the diagram, a control unit 51, a communication interface 52, and a hard disk 53.

As with the content distribution server device 30, the control unit 51 includes a CPU 54, a ROM 55, and a RAM 56, and the configuration of the communication interface 52 is also the same as that in the server device 30.

The hard disk 53 stores a pictogram display application 57 and a certified CP database 58.

The pictogram display application 57 is a unique Java application (Jar file and ADF) created by carriers in order to initiate downloads to the mobile terminal 10.

This pictogram display application 57 provides the following two functions to the JVM 68 of the mobile terminal 10.

a. Parameter Extraction Function

This is a function for extracting, from the header portion of HTML data received by the browser 61 of the mobile terminal 10, parameters for identifying a specific element associated with an anchor tag (called "element specification parameters").

b. Pictogram Display Function

This is a function for rendering a pictogram in the vicinity of a pointer indicating that a linked destination is safe when the position to which the pointer has moved overlaps with the position in the browser 61 in which text or images rendered by elements indicated by the parameters extracted from the header portion are displayed.

The certified CP database 58 is a collection of multiple records, each corresponding to HTML data provided as content data 37 by a certified content provider. A single record contained in this database has two fields, or "address" and "parameters". A URL (Uniform Resource Locator) indicating the storage location of the HTML data is stored in the "address" field. The element specification parameters are stored in the "parameters" field.

Each time a content provider that provides HTML data as content data 37 undergoes a certification examination and is certified by a carrier, a record is added to the database 58, and the URL and element specification parameters are stored in the fields of the added record. A general explanation of the flow of the certification process shall be given below.

A content provider submits, to a carrier, HTML data created using a website building tool such as Dreamweaver®, along with the URL of their own server in which that HTML data is to be stored and certification application documents filled out with other necessary items. Having received the submitted HTML data and certification application documents, the carrier examines whether or not the details of the submitted HTML data fulfill conditions for certification. Specifically, it is verified whether the details of the HTML data itself do not violate general decency, whether a Java application that maliciously obtains resources of the mobile terminal 10, such as personal information, is stored at a hyperlink written in that HTML data as anchor tag attributes, and so on. Having obtained a verification result that indicates the HTML data as being suitable for certification, the carrier adds a new record to the certified CP database 58 of the gateway server device 50 and, along with storing the URL of the HTML data denoted in the certification application documents in the "address" of the new record, stores the element specification parameters of the element associated with the anchor tag obtained through the verification process in the "parameters" field of that record. The carrier then notifies the content provider that the content has been certified. Having been notified, the content provider stores the HTML data in a storage region within its own server denoted as a URL in the certification application documents, and commences the distribution service thereof.

Next, operations performed in the present embodiment shall be described.

Figure 6:
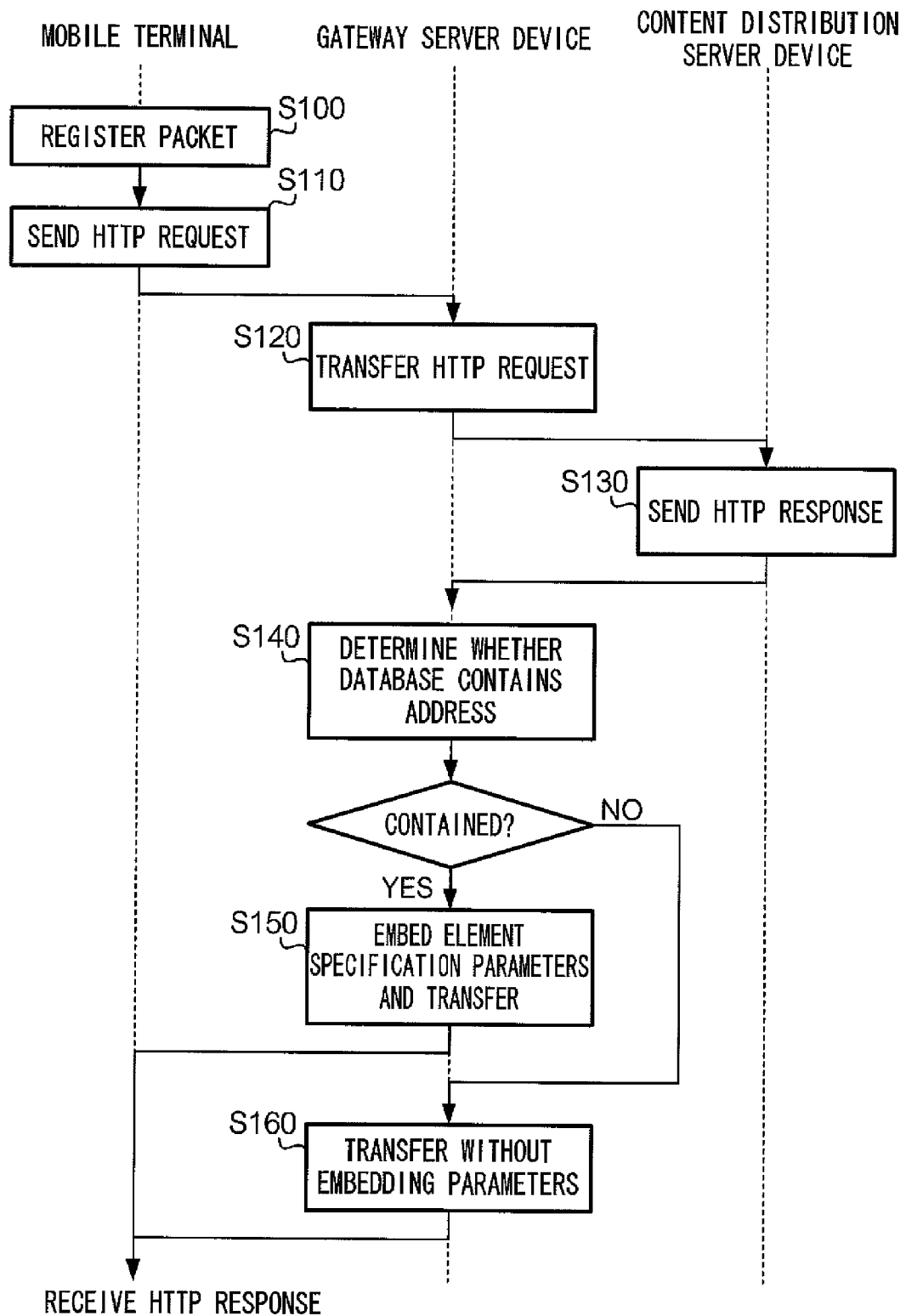
FIG. 6 is a flowchart illustrating operations performed according to an embodiment of the present invention.

FIG. 6 is a flowchart illustrating operations performed in the present embodiment. The start of the operations shown in this diagram is triggered by the instruction input unit 13 of the mobile terminal 10, which has downloaded the pictogram display application 57 stored in the gateway server device 50, being operated, launching the pictogram display application 57 and a browser application.

Figure 7:
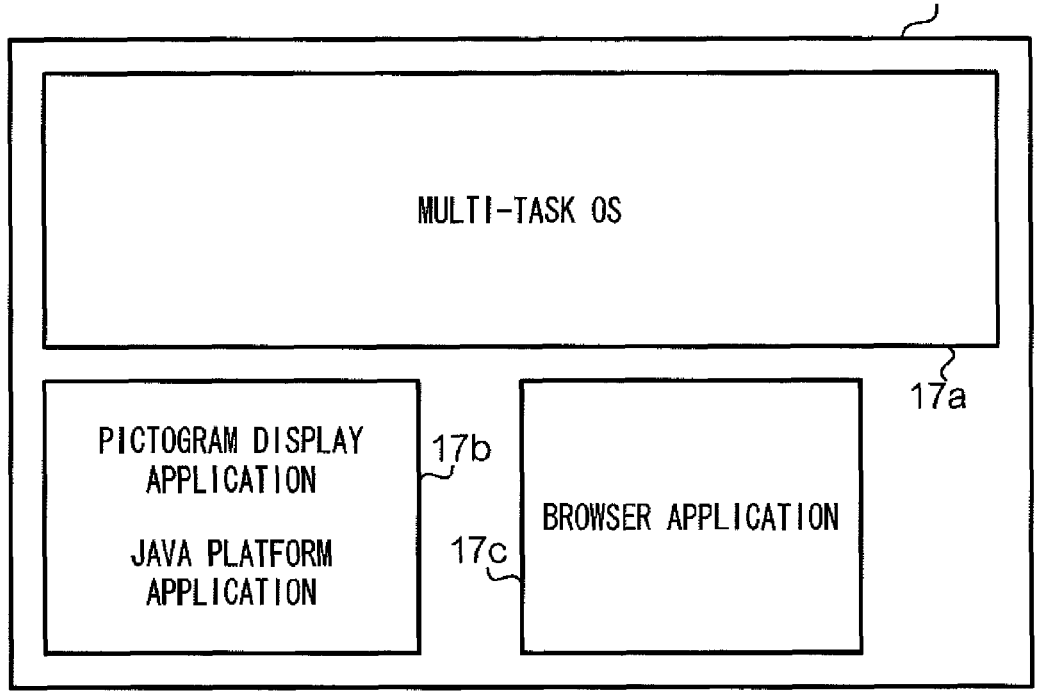
FIG. 7 is a diagram conceptually illustrating a memory space.

As described above, the multi-task OS 63 is installed in the mobile terminal 10, and thus the pseudo-parallel execution of multiple tasks is possible through a TSS. FIG. 7 is a diagram conceptually illustrating a memory space secured in the RAM 17 when the pictogram display application 57 and the browser application are launched together. As shown in this diagram, a memory space 17a, for loading the multi-task OS 63, a memory space 17b, for loading the pictogram display application 57 and a Java platform application that supports the execution thereof, and a memory space 17c, for loading the browser application, are secured individually within the RAM 17.

In FIG. 6, the control unit 11 of the mobile terminal 10 performs packet registration for the packet processing module of the mobile packet communication network 20 (S100). "Packet registration" is a registration procedure for conducting packet exchange between the terminal 10 itself and the mobile packet communication network 20. Having completed this packet registration, the mobile terminal 10 is able to transmit/receive various types of data to/from the Internet communication network 40.

Once the packet registration is complete, the control unit 11 of the mobile terminal 10 waits for a URL to be inputted through the instruction input unit 13. When the URL of content data that a user wishes to browse has been inputted through the instruction input unit 13, the control unit 11 sends an HTTP request containing a GET request method to the mobile packet communication network 20 using the inputted URL as the destination address (S110). The sent HTTP request is then transmitted to the gateway server device 50 via the mobile packet communication network 20.

The control unit 51 of the gateway server device 50 that received the HTTP request then executes a protocol conversion on the HTTP request and transfers the resultant to the Internet communication network 40 (S120). The transferred HTTP request is then transmitted to the destination content distribution server device 30 via the Internet communication network 40.

The control unit 31 of the content distribution server device 30 that received the HTTP request then sends an HTTP response, including the HTML data read out from the storage region of the hard disk 33 specified by the destination address in that HTTP request, to the Internet communication network 40, with the mobile terminal 10 from which the HTTP request originated as the destination (S130). The sent HTTP response is then transmitted to the gateway server device 50 via the Internet communication network 40.

The control unit 51 of the gateway server device 50 that received the HTTP response executes a protocol conversion on the HTTP response, and then determines whether or not the URL of the origin of the response is stored in the "address" field of any of the records in the certified CP database 58 (S140). In other words, in this step, it is determined whether or not the HTML data contained in the HTTP response is provided by a certified content provider.

Having determined in step 140 that the URL is stored in the certified CP database 58, the control unit 51 embeds, in the header portion of the HTTP response, the element specification parameters read out from the "parameters" field of the record whose "address" field stores the stated URL, and then transfers the HTTP response to the mobile packet communication network 20 (S150).

However, having determined in step 140 that the URL is not stored in the certified CP database 58, the control unit 51 does not embed the element specification parameters in the header portion, and instead transfers the HTTP response on which the protocol conversion has been executed directly to the mobile packet communication network 20 (S160). The transferred HTTP response is transmitted to the mobile terminal 10 as the destination thereof via the mobile packet communication network 20.

The control unit 11 of the mobile terminal 10 that received the HTTP response executes browser application tasks, thereby displaying, in the liquid-crystal display 14, a screen obtained by interpreting the HTML data contained in that HTTP response, and controls that display state based on the parameters embedded in the HTML data. To be more specific, processing is performed according to the following procedure.

The control unit 11 determines whether or not the element specification parameters are contained in the header portion of the HTML data, and if the element specification parameters are contained therein, extracts those element specification parameters from the header portion, and identifies the element the extracted parameters indicate.

Furthermore, a screen in which text or images indicating each element written as HTML data are arranged in accordance with the layout thereof is displayed in the liquid-crystal display 14. After the screen has been displayed in the liquid-crystal display 14 when the element specification parameters have been extracted, it is monitored whether or not the text or images displayed based on the elements indicated by the element specification parameters (display objects) and a selection icon (pointer) overlap; the display of a pictogram is triggered when the text or images and the selection icon overlap.

Figure 8:
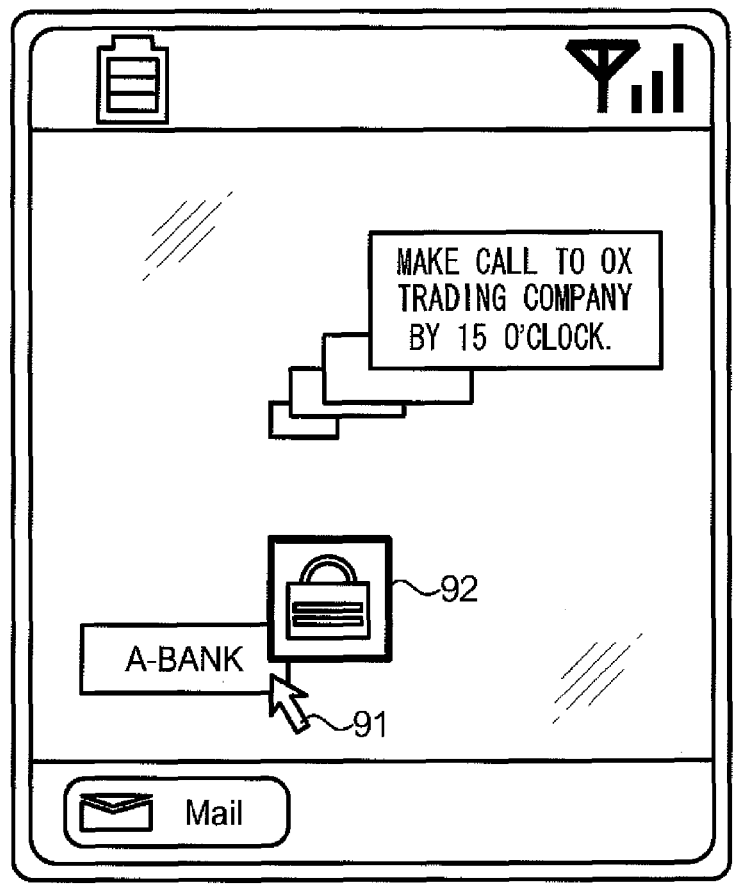
FIG. 8 is a diagram illustrating the display of a pictogram.

FIG. 8 is a diagram illustrating the display of this pictogram. As described above, the pictogram display application 57 provides the control unit 11 with a parameter extraction function and a pictogram display function. When an HTML response is received, the elements obtained by interpreting the HTML data contained in that response are displayed in the entire display region in the liquid-crystal display 14. This depends on the functions of the browser applications. Furthermore, in this diagram, out of the various elements and the text or images corresponding thereto, a selection icon 91 has moved to a location that overlaps with an image (a button) hyperlinked to the website of "A-Bank", and thus a pictogram 92 depicting a padlock indicating that the website is a safe site, is displayed in the vicinity of the selection icon 91. This is because the control unit 11 has, under the effects of the parameter extraction function of the pictogram display application 57, extracted the element specification parameters indicating the image (button) element of the "A-Bank" site from the header portion of the HTML response in advance, and furthermore, the control unit 11 has, under the effects of the pictogram display function, caused the pictogram 92 to appear in response to the image (button) of the "A-Bank" site indicated by the element specification parameters overlapping with the position to which the selection icon 91 has moved. Confirming the presence/absence of the appearance of this pictogram 92 makes it possible for a user to visually understand that the site to which the hyperlink leads is not provided by a malicious content provider.

According to the present embodiment as described thus far, when the gateway server device 50, operating under the management of a carrier, performs a protocol conversion on an HTTP response transferred from the Internet communication network 40 to the mobile packet communication network 20 via the device 50 itself, it determines whether or not the URL of the origin of that HTTP response is stored in a database, and when the URL is stored in the database, embeds the element specification parameters in the header portion thereof, and then transfers the resultant back to the mobile packet communication network 20.

Accordingly, if the pictogram display application 57 is downloaded from the gateway server device 50 to each mobile terminal 10 that may be the destination of the HTTP response in which the element specification parameters are embedded, a pictogram can be rendered in the liquid-crystal display 14 in response to text or images of the element indicated by the element specification parameters overlapping with the position to which the selection icon has moved. Through this, the mobile terminal 10 can prompt a user to exercise caution with respect to actions the user may take (sending information, making payments, and so on by clicking on a hyperlink, clicking a button, or the like) after the position of the selection icon has overlapped with the display object without performing repeated communication for confirming the reliability of the details to be processed based on the display object. Prompting the user to make a careful judgment by him/herself can provide an effect of preventing damage caused by a malicious content provider. Furthermore, carries do not need to burden providers with rules such as requiring the integration of specific programs into the content data 37 itself created by the certified content providers in order to guide users away from carelessly accessing malicious content.

A second embodiment of the present invention shall now be described.

The definitions of "carrier", "user", and "content provider" are the same in the present embodiment as in the first embodiment.

In the first embodiment, the gateway server device 50 that received an HTTP response destined for the mobile terminal 10 embeds element specification parameters in the header portion of the HTTP response and then transfers the response. However, the gateway server device 50 according to the present embodiment performs a protocol conversion on the HTTP response destined for the mobile terminal 10 and then transfers the response thereto, receives a request from the mobile terminal 10 that received that HTTP response, and then transmits the element specification parameters thereafter.

The hardware configurations of the mobile terminal 10, content distribution server device 30, and gateway server device 50 are the same as those in the first embodiment and thus the descriptions thereof shall not be repeated.

Figure 9:
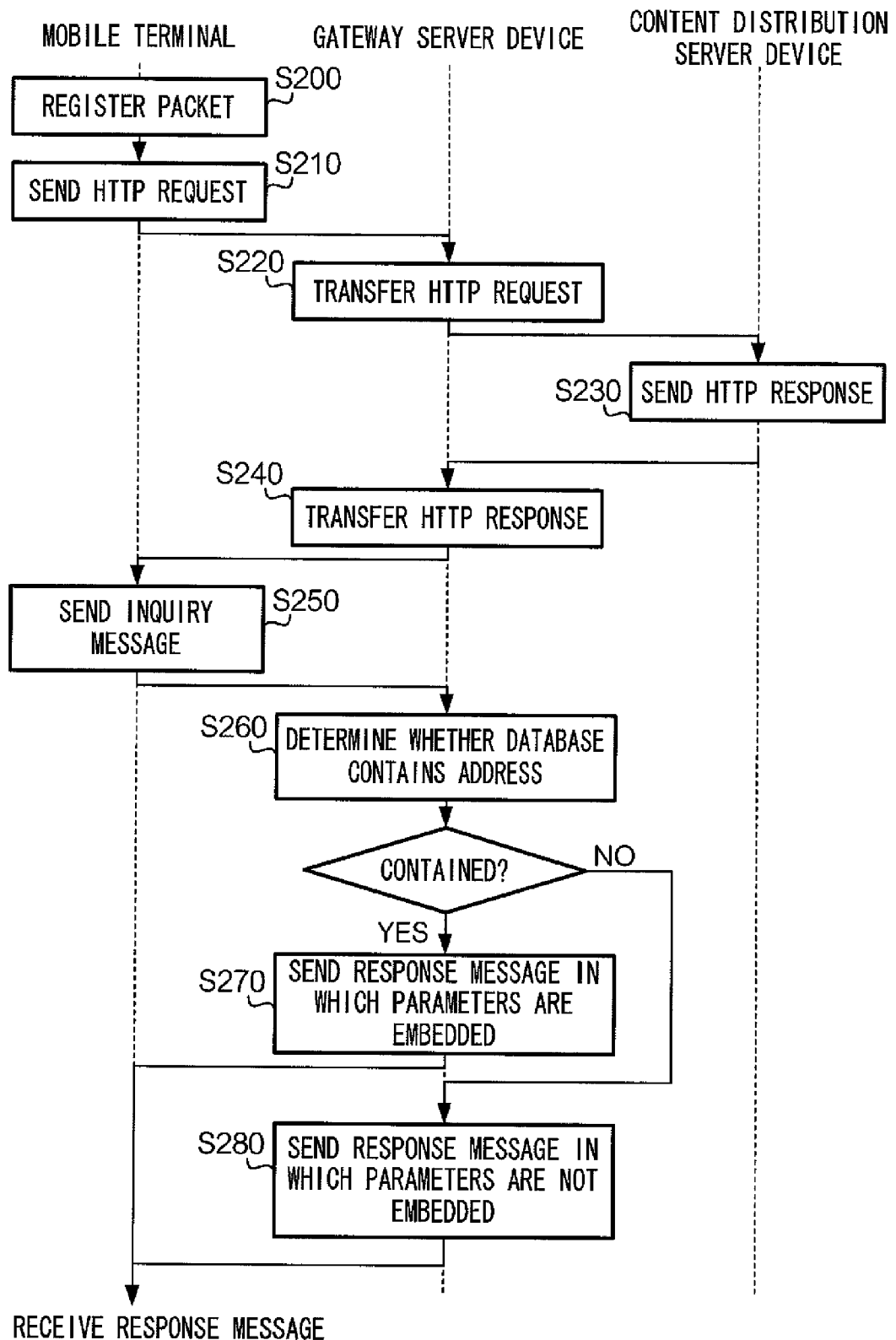
FIG. 9 is a flowchart illustrating operations performed according to another embodiment of the present invention.

FIG. 9 is a flowchart illustrating operations performed in the present embodiment. The start of the operations shown in this diagram is triggered by the instruction input unit 13 of the mobile terminal 10, which has downloaded the pictogram display application 57 stored in the gateway server device 50, being operated, launching the pictogram display application 57 and a browser application.

In FIG. 9, the control unit 11 of the mobile terminal 10 performs packet registration for the packet processing module of the mobile packet communication network 20 (S200).

Once the packet registration is complete, the control unit 11 of the mobile terminal 10 waits for a URL to be inputted through the instruction input unit 13. When the URL of content data that a user wishes to browse has been inputted through the instruction input unit 13, the control unit 11 sends an HTTP request containing a GET request method to the mobile packet communication network 20 using the inputted URL as the destination address (S210). The sent HTTP request is then transmitted to the gateway server device 50 via the mobile packet communication network 20.

The control unit 51 of the gateway server device 50 that received the HTTP request then executes a protocol conversion on the HTTP request and transfers the resultant to the Internet communication network 40 (S220). The transferred HTTP request is then transmitted to the destination content distribution server device 30 via the Internet communication network 40.

The control unit 31 of the content distribution server device 30 that received the HTTP request then sends an HTTP response, including the HTML data read out from the storage region of the hard disk 33 specified by the destination URL in that HTTP request, to the Internet communication network 40, with the mobile terminal 10 from which the HTTP request originated as the destination (S230). The sent HTTP response is then transmitted to the gateway server device 50 via the Internet communication network 40.

The control unit 51 of the gateway server device 50 that received the HTTP response then executes a protocol conversion on the HTTP response and transfers the resultant to the mobile packet communication network 20 (S240). The transferred HTTP response is transmitted to the mobile terminal 10 as the destination thereof via the mobile packet communication network 20.

Without interpreting the HTML data contained in the HTTP response, the control unit 11 of the mobile terminal 10 that received the HTTP response creates an inquiry message in which the URL of the content distribution server device 30 from which the response originated is embedded and sends that message to the mobile packet communication network 20 with the gateway server device 50 as the destination (S250).

The sent inquiry message is then transmitted to the gateway server device 50 via the mobile packet communication network 20.

The control unit 51 of the gateway server device 50 that received the inquiry message determines whether or not the URL embedded in that message is stored in the "address" field of any of the records in the certified CP database 58 (S260).

Having determined in step 260 that the URL is stored in the certified CP database 58, the control unit 51 sends, to the mobile packet communication network 20, a response message in which the element specification parameters read out from the "parameters" field of the record whose "address" field stores the stated URL are embedded (S270).

However, having determined in step 270 that the URL is not stored in the certified CP database 58, the control unit 51 transfers, to the mobile packet communication network 20, a response message in which the element specification parameters are not embedded (S280).

The sent response message is transmitted to the mobile terminal 10 as the destination thereof via the mobile packet communication network 20. The control unit 11 of the mobile terminal 10 that received the response message controls the display of a pictogram using those parameters when the element specification parameters are embedded in the message.

As described thus far, a user can be guided away from carelessly accessing malicious content in the same manner as in the first embodiment, even if the communication is divided into two sessions, one of exchanging HTML data, and one of exchanging element specification parameters.

Many variations on the present invention are possible.

In the above embodiments, the pictogram display application 57 is stored in the hard disk 53 of the gateway server device 50 and is downloaded from the gateway server device 50 in response to a request from the mobile terminal 10. However, a server device operated under the management of a carrier may be provided on the Internet communication network 40; the pictogram display application 57 may be stored therein and downloaded to the mobile terminal 10 from that server device.

The configuration may also be such that the pictogram display application 57 is stored in advance in the ROM 16 of the mobile terminal 10 as a native application, rather than as a Java application that operates under the Java operating environment.

In the above embodiments, when the URL of the origin of an HTTP response that has traveled through the gateway server device 50 itself is stored in the hard disk 53, the gateway server device 50 embeds element specification parameters, for identifying a specific element contained in the HTML data of that HTTP response, in the header portion thereof and the response is transferred. The mobile terminal 10 that received the HTTP response then displays a pictogram when the element indicated by the element specification parameters, out of all the elements displayed in the liquid-crystal display 14 based on the results of the HTML data contained in the response being interpreted, overlaps with a selection icon. In other words, in the above embodiments, the gateway server device 50 uses the element specification parameters to specify each of the elements for which pictograms are to be displayed when overlapping with the selection icon.

However, the gateway server device 50 may embed, in the header portion of the HTTP response, only parameters indicating, in binary format, whether the URL of the origin of the HTTP response is stored in the hard disk 53, or in other words, whether or not that URL has been provided by a certified content provider, and then transfer the response. In this variation, the mobile terminal 10 that received an HTTP response containing such parameters identifies elements hyperlinked to other sites (that is, elements for which a pictogram is to appear) using one of the following two schemes. In the first scheme, tag types associated with specific elements that change the display format when the parameters are contained within the header portion are pre-registered in the pictogram display application 57, and when the tags of those specific elements have been extracted during the process of interpreting the HTML data, a pictogram is displayed when text or images displayed in accordance therewith overlap with the selection icon. In the second scheme, tag types are not registered in advance; a pictogram is displayed for all text and images displayed in accordance with the tags extracted during the process of interpreting the HTML data when the selection icon overlaps therewith.

In sum, if the parameters embedded in the HTML data by the gateway server device 50 are parameters that stipulate the display format of the content in the mobile terminal 10, those parameters need not indicate a specific element.

Although in the above embodiments, the gateway server device 50 embeds the element specification parameters in the HTTP response that travels through the device 50 itself, the content distribution server device 30 may prepare, in the hard disk 33, HTML data in which the element specification parameters have been embedded, and return the HTML data in which the parameters have been embedded as an HTTP response upon the reception of an HTTP request. According to this variation, the same effects as the above embodiments can be obtained, without causing the gateway server device 50 to determine whether or not the origin of the HTTP response is the server device of a certified content provider.

Although in the above embodiments, the gateway server device 50 embeds the element specification parameters in the header portion of an HTTP response, those parameters may be transferred as part of the actual data of the HTTP response instead. That is, the form in which the parameters are embedded is not particularly limited as long as the element specification parameters can be extracted from the HTTP response by the mobile terminal 10.

In the above embodiments, the operations performed when distributing an HTTP response containing HTML data, which is one type of content data, were described as being operations performed by the gateway server device; however, the same processing may be performed when distributing Java applications. In other words, it may be determined whether or not a Java application downloaded in response to a request from the mobile terminal 10 is provided by a certified content provider when the application travels through the gateway server device 50, and if the application is provided by a certified content provider, parameters indicating that fact may be embedded in the application and the application may then be downloaded. Also, it is not necessary to describe the elements to be displayed as content in the liquid-crystal display 14 of the mobile terminal 10 and the layout thereof in HTML; another markup language, such as XML (Extensible Markup Language), may be used instead.

Although in the above embodiments, the mobile terminal 10, or in other words, a mobile telephone capable of accessing the Internet communication network 40 via the mobile packet communication network 20, is provided with the pictogram display application 57, the same effects can be obtained by providing a personal computer capable of directly accessing the Internet communication network 40 with the same type of application.

Although in the above embodiments, whether content to which a hyperlink leads is provided by a certified content provider or is provided by an uncertified content provider is identified based on the presence/absence of the appearance of the pictogram 92, this identification may be made using the pictogram 92 based on whether the URL of the content to which the hyperlink leads is registered in a user's bookmarks, stored in a removable external storage medium such as a UIM (User Identity Module), or the like. Furthermore, whether or not the content to which the hyperlink leads is payable using the application of a specific payment system (Edy®, Suica®, or the like) may be identified based on the pictogram 92.

Although in the above embodiments, the pictogram 92 depicting a padlock appears in the vicinity of the selection icon 91 when the selection icon 91 overlaps with text or images indicated by the element specification parameters, an arbitrary image (advertisement) selected by the carrier, certified content provider, or the like may be caused to appear instead of a padlock.

The hardware and software configurations of the mobile terminal, gateway server device, and content distribution server device are not limited to those illustrated in FIGS. 2, 3, 4, 5, and 7. Any structural format may be used as long as it is capable of realizing the functions of the present invention.

The programs executed by the control unit 11, the control unit 31, or the control unit 51 in the above embodiments may be provided in a form in which they are stored in a computer-readable recording medium such as a magnetic recording medium (magnetic tape, a magnetic disk (an HDD (Hard Disk Drive), an FD (Flexible Disk)), or the like), an optical recording medium (an optical disk (a CD (Compact Disk), a DVD (Digital Versatile Disk)), or the like), a magneto-optical recording medium, a semiconductor memory (a flash ROM or the like), or the like. These programs may also be provided to a mobile terminal, gateway server device, or content distribution server device via a network such as the Internet.

What is claimed is:

1. A content distribution management device comprising:
a storage unit that stores one or a plurality of addresses;
a receiving unit that receives content data addressed to a communication terminal;
a determination unit that determines whether or not the address of the origin of the received content data is an address that is stored in the storage unit; and
a sending unit that, in the case where the determination unit has determined that the address of the origin of the received content data is an address that is stored in the storage unit, sends the content data and parameters specifying the format in which content is to be displayed by the communication terminal to which the content data is addressed to that communication terminal,
wherein the content data is code that describes elements that indicate each of display objects that make up the content and layout information of each of the display objects using a predetermined markup language; and
further wherein the parameters either indicate an element of a display object for which a predetermined pictogram is rendered upon being overlapped with a pointer due to an input unit of the communication terminal being operated after the object has been displayed in the display; or the parameters indicate an element of a display object for which a predetermined pictogram is rendered upon being highlighted due to an input unit of the communication terminal being operated after the object has been displayed in the display.

2. The content distribution management device according to claim 1, further comprising:
a unit that receives a request containing the address of an Internet communication network from the communication terminal; and
a unit that transfers the received request to the Internet communication network.

3. A content distribution management device comprising:
a storage unit that stores one or a plurality of addresses;
a receiving unit that receives, from a communication terminal that has received content data, the address of where the content data is stored;
a determination unit that determines whether or not the received address is an address that is stored in the storage unit; and
a sending unit that, in the case where the determination unit has determined that the received address is an address that is stored in the storage unit, sends parameters specifying the format in which content is to be displayed by the communication terminal to which the content data is addressed to that communication terminal,
wherein the content data is code that describes elements that indicate each of display objects that make up the content and layout information of each of the display objects using a predetermined markup language; and
further wherein the parameters either indicate an element of a display object for which a predetermined pictogram is rendered upon being overlapped with a pointer due to an input unit of the communication terminal being operated after the object has been displayed in the display; or the parameters indicate an element of a display object for which a predetermined pictogram is rendered upon being highlighted due to an input unit of the communication terminal being operated after the object has been displayed in the display.

4. The content distribution management device according to claim 1,
wherein the element that indicates the display object expresses a hyperlink to an address that has received a predetermined certification.

5. A communication terminal comprising:
a display;
an input unit;
a receiving unit that receives content data that describes elements that each indicate display objects and the layout thereof using a predetermined markup language and parameters that indicate a specific element;
a first display control unit that displays a display object indicated by an element contained in the received content data in the display in accordance with the layout information; and
a second display control unit that renders a predetermined pictogram when the display object, among the display objects displayed in the display, that is displayed based on the element indicated by the received parameters overlaps with a pointer due to operations of the input unit.

6. A communication terminal comprising:
a display;
an input unit;
a receiving unit that receives content data that describes elements that each indicate display objects and layout information for the display objects using a predetermined markup language, and parameters that indicate a specific element;
a first display control unit that displays a display object indicated by an element of the received content data in the display in accordance with the layout information; and a second display control unit that renders a predetermined pictogram when the display object, among the display objects displayed in the display, that is displayed based on the element indicated by the received parameters is highlighted due to operations of the input unit.

7. A computer program that causes a computer having a display, an input unit, and a communication unit to execute:
   receiving, via the communication unit, content data that describes elements that each indicate display objects and layout information for the display objects using a predetermined markup language, and parameters that indicate a specific element;
   displaying a display object indicated by an element of the received content data in the display in accordance with the layout information; and
   rendering a predetermined pictogram when the display object, among the display objects displayed in the display, that is displayed based on the element indicated by the received parameters overlaps with a pointer due to operations of the input unit.

8. A computer program that causes a computer provided with a display, an input unit, and a communication unit to execute:
   receiving, via the communication unit, content data that describes elements that each indicate display objects and layout information for the display objects using a predetermined markup language, and parameters that indicate a specific element;
   displaying a display object indicated by an element of the received content data in the display; and
   rendering a predetermined pictogram when the display object, among the display objects displayed in the display, that is displayed based on the element indicated by the received parameters is highlighted due to operations of the input unit.

9. A content distribution system comprising:
   a content distribution management device that includes:
      a storage unit that stores one or a plurality of addresses;
      a receiving unit that receives content data addressed to a communication terminal;
      a determination unit that determines whether or not the address of the origin of the received content data is an address that is stored in the storage unit; and
      a sending unit that, in the case where the determination unit has determined that the address of the origin of the received content data is an address that is stored in the storage unit, sends the content data and parameters specifying the format in which content is to be displayed by the communication terminal to which the content data is addressed to a communication terminal, and
   a communication terminal that includes:
      a receiving unit that receives parameters and content data from the content distribution management device; and
      a content display control unit that displays the received content data and controls the display format thereof in accordance with the received parameters,
   wherein the content data is code that describes elements that indicate each of display objects that make up the content and layout information of each of the display objects using a predetermined markup language; and
   further wherein the parameters either indicate an element of a display object for which a predetermined pictogram is rendered upon being overlapped with a pointer due to an input unit of the communication terminal being operated after the object has been displayed in the display; or the parameters indicate an element of a display object for which a predetermined pictogram is rendered upon being highlighted due to an input unit of the communication terminal being operated after the object has been displayed in the display.

* * * * *